UNITED STATES PATENT OFFICE.

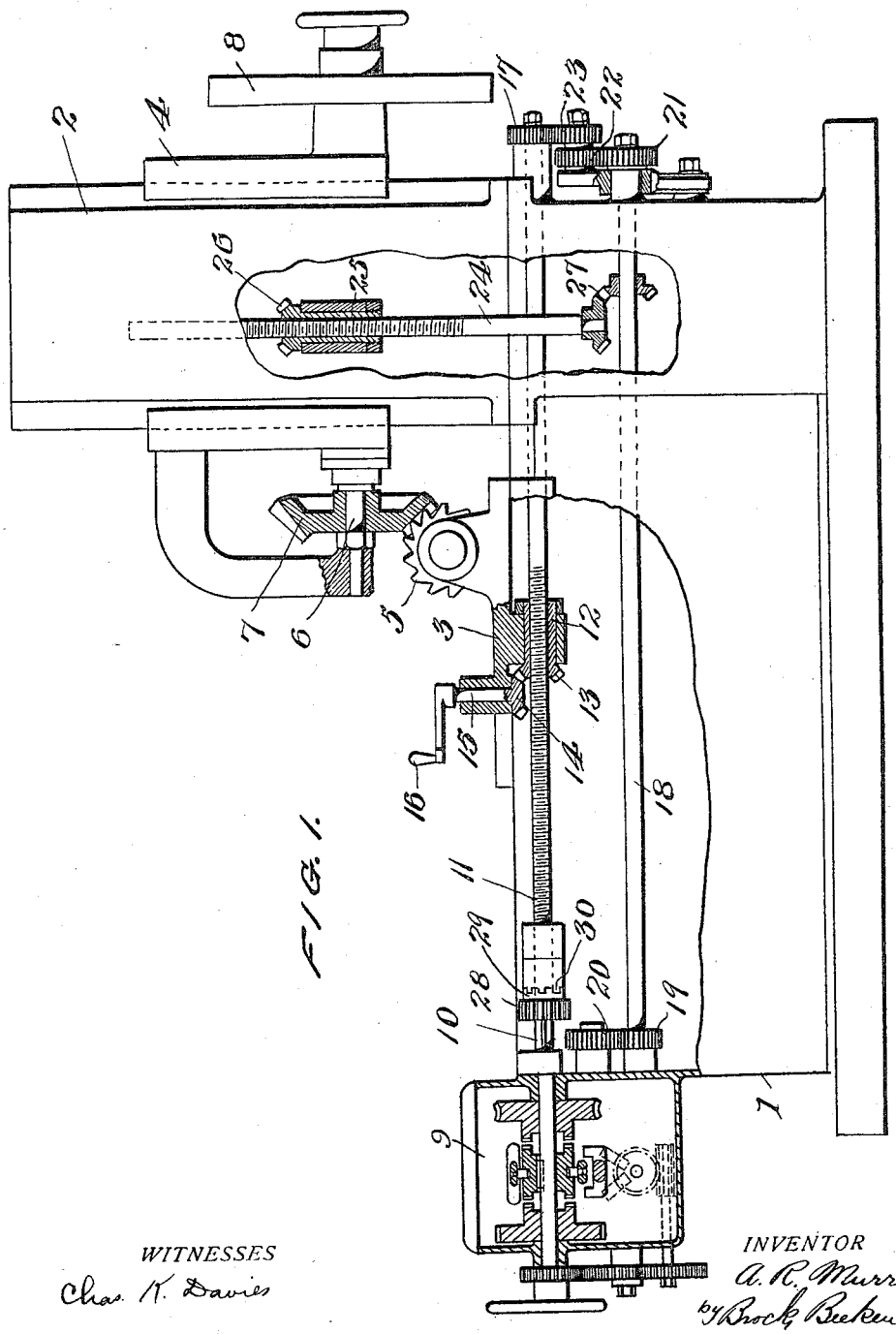

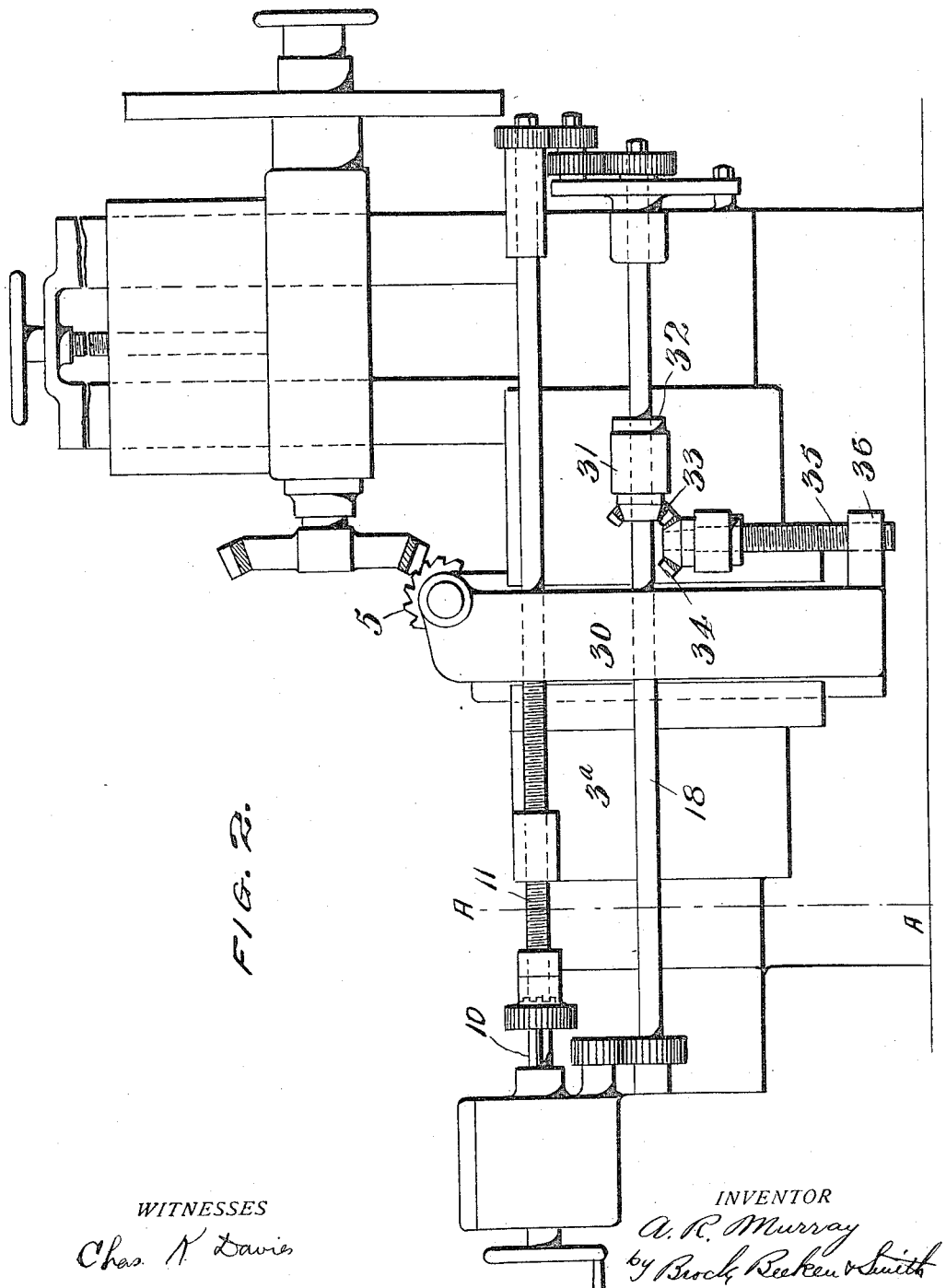

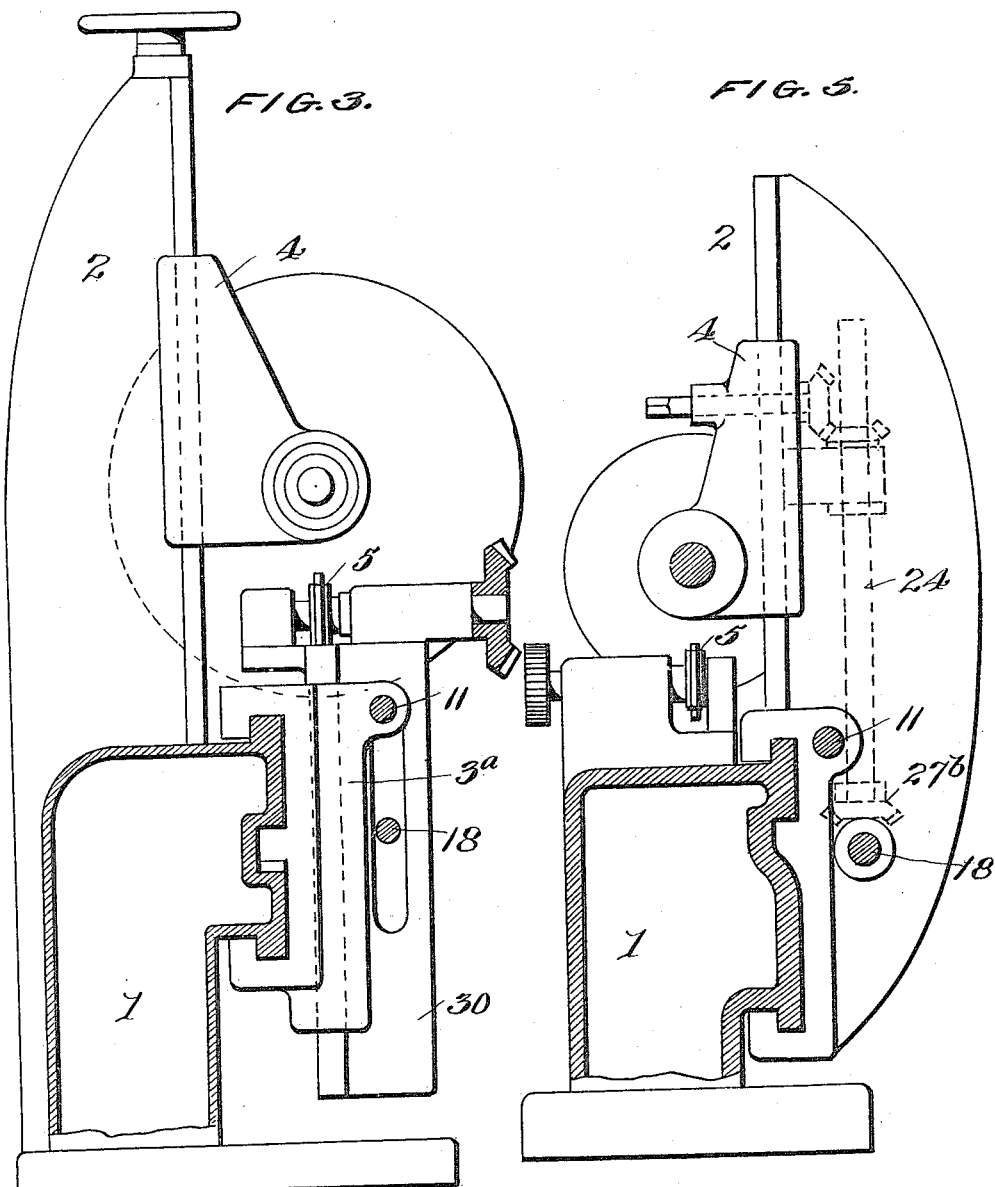

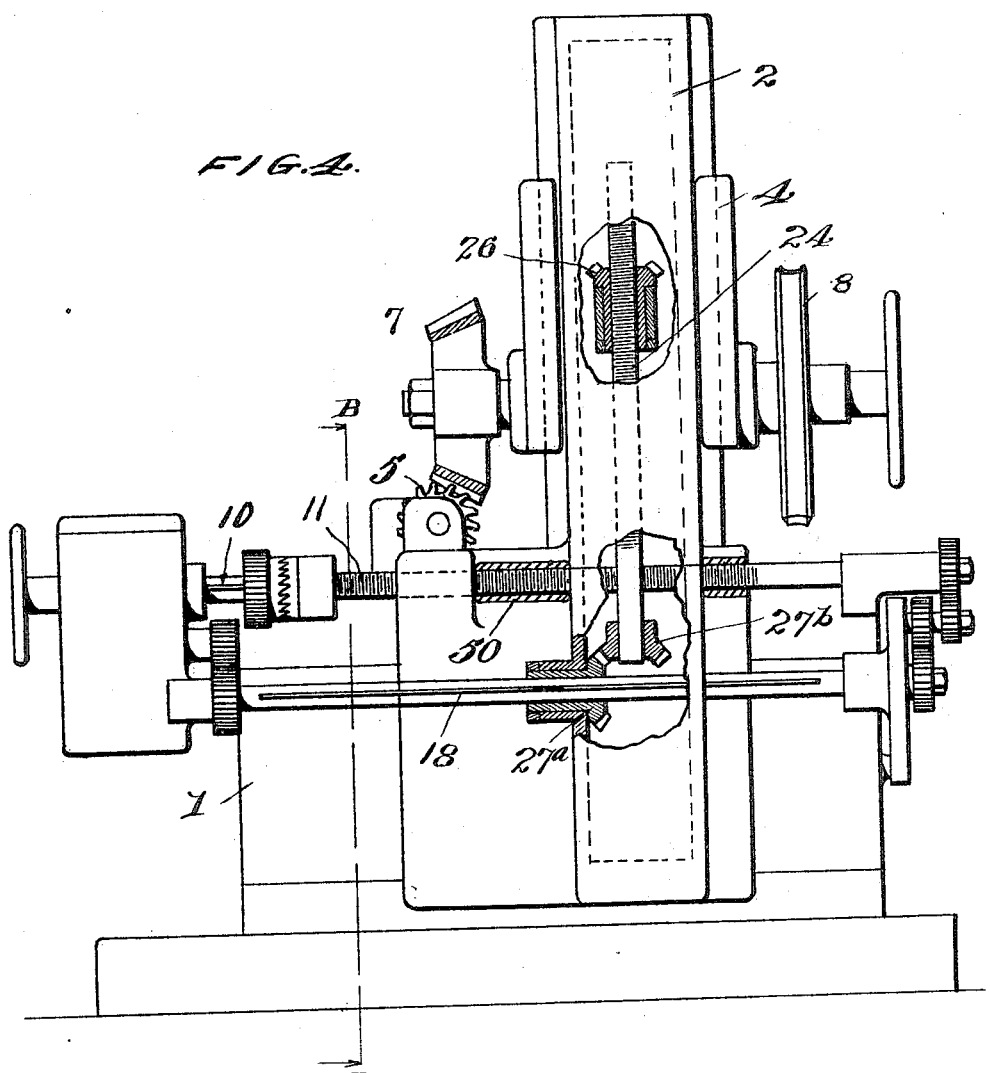

ARISTIDES REYNOLDS MURRAY, OF CINCINNATI, OHIO.

GEAR-CUTTING MACHINE.

1,138,005.  Specification of Letters Patent.  Patented May 4, 1915.

Application filed April 3, 1909. Serial No. 487,689.

*To all whom it may concern:*

Be it known that I, ARISTIDES R. MURRAY, a citizen of the United States, residing at Cincinnati, in the county of Hamilton and State of Ohio, have invented new and useful Improvements in Gear-Cutting Machines, of which the following is a specification.

My invention consists in a novel gear cutting machine.

A machine constructed in accordance with my invention may be adjusted so that in addition to bevel gears of different angles it will cut spur and face gears.

The method of operation of the machine consists briefly in imparting to the blank and a tool in contact therewith, two relative motions in different directions, the resultant relative movement of the tool in relation to the blank being in one of the focal lines of the gear. While the different directions of movement may be at different angles it is generally more convenient to make these movements at right angles to each other.

The machine may vary greatly in construction. The accompanying drawing shows exemplifying forms.

Figure 1 is a diagrammatic side elevation of a machine embodying the invention, a part of the base being broken away to show the mechanism. Fig. 2 is a side elevation of a modified form of the machine. Fig. 3 is a section on the line A—A of Fig. 2. Fig. 4 is a side elevation of another modified form of the machine, certain parts being broken away. Fig. 5 is a section on the line B—B, Fig. 4.

Referring first to Fig. 1, reference numeral 1 designates a base, carrying blank column 2. The cutter slide or carriage 3 is mounted for horizontal reciprocation on the base. The work-saddle or carriage 4, is mounted for vertical reciprocation on column 2. The slide 3 carries the tool 5 which in this exemplification is a rotary milling cutter. Any suitable mechanism is to be provided for rotating the cutter.

The work-saddle carries the blank spindle 6 on which the blank 7 is secured. The spindle also is provided with a worm-gear 8 as an exemplification of any suitable indexing mechanism for rotating the blank to bring it in position for the successive cuts.

At the head of the machine is a box 9 containing any suitable forward and reverse driving mechanism for rotating shaft 10 in either direction for the feed and return movements of the tool or blank. In line with shaft 10 is feed screw 11 which engages a nut 12 rotatably mounted in the cutter slide. The nut is provided with a bevel pinion 13 engaging a similar pinion 14 on a vertical shaft 15 carried by the slide and provided with a crank 16. By means of the crank and pinions 13, 14, the nut 12 may be rotated and the position of the cutter slide on the screw adjusted. The screw 11 carries at its rear end a gear 17.

Parallel with screw 11 is mounted shaft 18 which carries at its forward end a gear 19 engaging an idle gear 20, and at its rear end a gear 21. Changeable pinions 22, 23 connect gears 17 and 21 so that when either screw 11 or shaft 18 is rotated, the other rotates with it at a speed depending on the diameters of the gears and pinions 17, 21, 22, 23. Any other suitable change speed devices may be provided to connect screw 11 and shaft 18 and to vary their relative speeds.

A second feed screw 24 rotatably mounted in column 2 engages a nut 25 carried by the work-saddle and provided with adjusting means 26, similar to the parts 13, 14, 15, 16 already described in connection with the cutter slide. Screw 24 is connected revolubly with shaft 18 by bevel pinions 27.

Shaft 10 carries a pinion 28 slidably splined to the shaft and provided with positive clutch teeth 29 adapted to engage similar teeth 30 carried by screw 11. The pinion 28 and its clutch 29 are sometimes identified as the " driving member."

Assuming that it is desired to cut a bevel gear of 45 degrees angle, the gears 17, 21, 22, 23 intermediate screw 11 and shaft 18 are arranged so that the shaft and screw revolve at the same speed. The clutch 29 of the driving member is engaged with clutch 30 on screw 11 and as shaft 10 revolves in the feed direction screw 11 impels the rotating cutter 5 horizontally toward the blank. Through gears 17, 21, 22, 23, shaft 18 is at the same time revolved and drives screw 24 through bevel gears 27. The screw 24 engaging nut 25 moves the work-saddle vertically upward at the same speed with which the cutter moves toward the blank. The resulting point of contact between the cutter and the blank moves along the 45 degree focal line of the gear until the cutter has passed through the blank completing one cut. At the end of the cut the direction of movement of shaft 10 is reversed and the cutter and blank are retracted to their original positions, the blank is then indexed, another cut is made, and so on.

To cut bevels of a more acute angle than 45° it is evident that the cutter should move at a greater speed than the blank. The ratio of movement of the blank and cutter is the tangent of the cutting angle. For more acute angles the gears 17, 21, 22, 23 are therefore so adjusted as to give this ratio of motion of the cutter and blank. For gears of greater angles than 45° the blank should move faster in relation to the cutter.

For smaller angles than 45° the driving member 28 is retained in engagement with clutch 30, and by changing the gears 17, 21, 22, 23 bevels may be cut from 45° to any desired approximation to a straight angle. For true spur gears shaft 18 is disconnected from screw 11 by removing any of the gears 17, 21, etc. The machine will then act as an ordinary spur gear cutter, the work-saddle being held stationary by screw 24. Gears of greater angle than 45° might be cut with the driving member in engagement with clutch 30 by properly adjusting the change speed gears 17, 21, etc., but to reduce the number of change gear sets required it is preferable for cutting gears of a greater angle to shift the driving member so that gear 28 is in engagement with idler 20 and clutch 29 is free from clutch 30 on screw 11. Shaft 10 then rotates shaft 18 through the idler and screw 11 is driven from shaft 18. One set of change gears in this way may serve for cutting one gear of an angle less than 45° and another gear of greater angle than 45°.

To cut face gears pinion 28 is kept in engagement with idler 20 and screw 11 is disconnected from shaft 18 so that the cutter slide is held stationary by screw 11 and the machine acts as a vertical milling gear-cutter, the blank moving in relation to the cutter axis to make the cut.

Figs. 2 and 3 show a different form of the invention in which the axis of the blank remains stationary and the two different motions are imparted to the cutter. The horizontally moving cutter slide 3ᵃ carries a second slide 30 sometimes identified as a carriage, mounted on slide 3ᵃ for vertical movement. The slide 3ᵃ carries a bearing 31 in which is a sleeve 32 splined to shaft 18. The sleeve carries a bevel pinion 33 engaging a similar pinion 34 on the vertical feed screw 35 revolubly mounted on slide 3ᵃ. The screw engages a nut 36 on slide 30. The other parts are arranged substantially as in Fig. 1. The cutter is moved horizontally by screw 11 as before and at the same time is moved vertically at the proper speed ratio by screw 35 which acts on the vertical slide 30.

Figs. 4 and 5 show another form of the invention in which the cutter axis remains stationary and the blank is moved in two different directions to attain the desired result. The work column 2 is mounted on guides to reciprocate on the base 1, and the saddle 4 is vertically movable on the column as in Fig. 1. Screw 24 is connected with the blank-saddle as in Fig. 1 but bevel gear 27ᵃ for driving screw 24 is splined to shaft 18 and is carried by a suitable bearing in the column. Screw 11 instead of connecting with a cutter slide engages a nut 50 on the blank column. Other parts may be substantially as in the other forms of the invention and the method of operation will be apparent to persons versed in the art from the foregoing description of Figs. 2 and 3.

From the foregoing it becomes apparent that in my invention, broadly considered, it is of no consequence whether the tool and the blank are moved simultaneously or whether either one is held stationary and the other is moved in relation to it in two different directions simultaneously to give a resultant relative motion of the tool and blank which is in one of the focal lines of the gear.

I claim:

1. In a machine tool, the combination of two feed screws arranged substantially at right angles, a carriage driven by one screw, another carriage driven by the other screw, gearing intermediate the screws whereby when one is rotated the other is rotated at a definite speed ratio, a driving member, and means by which said driving member may initially drive either of said screws as desired.

2. In a machine tool, the combination of two feed screws arranged substantially at right angles, a carriage driven by one screw, another carriage driven by the other screw, gearing intermediate the screws whereby when one is rotated, the other is rotated at a definite speed ratio, a driving member, means for impelling the driving member in forward and reverse directions, and means by which said driving member may initially drive either of said screws as desired.

3. In a machine tool, the combination of two feed screws arranged substantially at right angles, a carriage driven by one screw, another carriage driven by the other screw, changeable gearing intermediate the screws, a driving member, and means for connecting the driving member selectively to initially drive either of the screws.

4. In a machine tool, the combination of a feed screw, a clutch member thereon, a pinion splined on said screw and having a clutch member to engage the screw clutch member, a carriage impelled by said screw, a shaft adjacent to said screw, gearing connected with said shaft and adapted to be engaged by said pinion, other gearing intermediate said shaft and said screw, a second feed screw arranged substantially at right angles to the screw first mentioned and a drive connection between said shaft and said second screw.

5. In a machine tool, the combination of a cutter and a work holder, a feed screw, a carriage impelled thereby, another feed screw arranged transversely to the first, another carriage impelled by the screw last named, a shaft, gearing connecting the shaft and one of said screws, other gearing connecting the shaft and the other of said screws, a driving member and means by which the driving member is connected to initially drive the screw last named or the shaft, as desired.

6. In a machine tool, the combination of a bed and work column, a cutter, a feed screw, carriages mounted to move in directions substantially at right angles to each other, a screw connected to impel one carriage, another screw connected to impel the other carriage, a shaft, gearing connecting the shaft and one of said screws, change speed gearing connecting the shaft and the other screw, a driving member, and selective means for connecting the driving member to initially impel one of the screws or said shaft, as desired.

7. In a gear cutting machine, a cutting element, and a work element; means to effect two relative motions in the same plane between the said cutting element and the said work element, said motions being in predetermined angular relation; and means to vary the velocity ratio of said motions.

8. In a bevel gear cutting machine; a cutting element, and a work element; means to effect two relative motions in the same plane between the said cutting element and the said work element, one of said motions being in the direction of the axis of the said work element and the other at right angles thereto; and means to vary the velocity ratio of said motions.

9. In a gear cutting machine; a cutter carriage, and a suitable cutter carried thereby; a workhead adapted to retain the blank to be cut; a feed train to impart a feeding motion to said cutter carriage; a feed train to impart a feeding motion to said workhead simultaneously with the feeding of said cutter carriage; and a ratio change train intermediate of said two feed trains to vary the velocity ratio between the feeds imparted to said cutter carriage and workhead.

10. In a gear cutting machine, a cutter carriage, and a suitable cutter carried thereby; a workhead adapted to retain the blank to be cut; means to impart a feeding motion to said cutter carriage; means to simultaneously therewith impart a feeding motion to said workhead; said motions being in the same plane and in predetermined angular relation; means to vary the velocity ratio between said feeding motions; and means to transmit the driving power to the faster moving members of said feeding means.

11. In a gear cutting machine, a cutter carriage, and a suitable cutter carried thereby; a workhead adapted to retain the blank to be cut; means to impart a feeding motion to said cutter carriage; means to simultaneously therewith impart a feeding motion to said workhead, said motions being in the same plane and in predetermined angular relations; means to vary the velocity ratio between said feeding motions; and means to transmit the driving power directly to that one of the feeding means which imparts the faster feeding motion.

12. In a gear cutting machine, a cutter carriage and a suitable cutter carried thereby, a workhead adapted to retain the blank to be cut, a feed train to impart a feeding motion to said cutter carriage, a feed train to impart a feeding motion to said workhead simultaneously with the feeding of said cutter carriage, a ratio change train intermediate of said two feed trains to vary the velocity ratio between the feeds imparted to said cutter carriage and workhead, a power shaft, means thereon adapted to transmit power to either of said feed trains, and means to connect said power transmitting means with the faster moving feed train.

13. In a gear cutting machine, a cutter carriage and a suitable cutter carried thereby, a workhead adapted to retain the blank to be cut, a feed train to impart a feeding motion to said cutter carriage; a feed train to impart a feeding motion to said workhead simultaneously with the feeding of said cutter carriage, a ratio change train intermediate of said two feed trains to vary the velocity ratio between the feeds imparted to said cutter carriage and workhead, a power shaft, suitable gearing thereon to engage the gearing of one of said feed trains, a normally disengaged gear wheel of said other feed train, and means to disengage said first feed train and to engage said power shaft gearing with said normally disengaged gear wheel of the other feed train.

ARISTIDES REYNOLDS MURRAY.

Witnesses:
W. J. FOSTER,
N. B. CHACE.